United States Patent Office 3,284,474
Patented Nov. 8, 1966

3,284,474
17β-N-(DIALKYLAMINOALKYL)-AMINOANDROST-5-ENES, 3-DEHYDRO COMPOUNDS CORRESPONDING AND DERIVATIVES THEREOF
Paul D. Klimstra, Northbrook, Ill., assignor to G. D. Searle & Co., Chicago, Ill., a corporation of Delaware
No Drawing. Filed Feb. 8, 1965, Ser. No. 431,169
9 Claims. (Cl. 260—397)

The present invention is concerned with novel steroidal unsaturated amines and especially with 17β-N-(dialkylaminoalkyl)aminoandrost-5-enes, 3-dehydro compounds corresponding and derivatives thereof which can be represented by the following structural formula

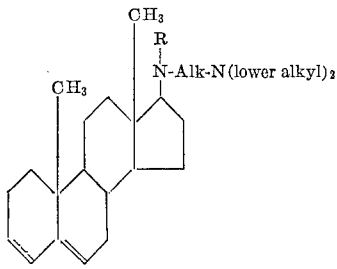

wherein R can be hydrogen or a formyl or methyl radical, Alk represents a lower alkylene radical, and the dotted line symbolizes an optionally doubly-bonded linkage between carbon atoms 3 and 4.

The lower alkylene radicals symbolized by Alk in the foregoing representation are defined by the following formula

wherein $n$ is a positive integer less than 6 and are typified by methylene, ethylene, trimethylene, tetramethylene, pentamethylene, and the branched-chain radicals isomeric therewith. Examples of lower alkyl radicals depicted in the structural formula above are methyl, ethyl, propyl, butyl, pentyl, hexyl, heptyl, and the branched-chain isomers thereof.

Starting materials suitable for the manufacture of the compounds of this invention are the 17-keto androst-5-enes and 17-keto androsta-3,5-dienes represented by the following structural formula

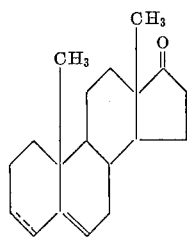

wherein the dotted line is as herein before defined. The reaction of those 17-keto substances with a diamine of the formula NH₂-Alk-N(lower alkyl)₂ in the presence of formic acid results in the instant N-formyl compounds. Typically, androsta-3,5-dien-17-one is heated with 3-dimethylaminopropylamine in formic acid to produce 17β-N-(3-dimethylaminopropyl)formamidoandrosta-3,5-diene.

Reduction of the aforementioned instant formamido substances, suitably with a chemical reducing agent, results in the N-methyl compounds of the present invention. 17β-(3-dimethylaminopropyl)formamidoandrosta-3,5-diene, for example, is contacted with lithium aluminum hydride in dioxane at the reflux temperature to produce 17β-N-(3-dimethylaminopropyl)-N-methylaminoandrosta-3,5-diene.

The instant compounds containing a secondary amino nitrogen at the 17-position are obtained by hydrolysis of the corresponding formamido substances. A specific example is the reaction of 17β-N-(3-dimethylaminopropyl)formamidoandrost-5-ene with hydrogen chloride in aqueous methanol to afford 17β-(3-dimethylaminopropyl)aminoandrost-5-ene.

The N-methyl compounds of this invention can be obtained alternatively by alkylation of the corresponding instant compounds wherein R is hydrogen. Typically, 17β-N-(3-dimethylaminopropyl)aminoandrost-5-ene is contacted with formic acid and formaldehyde to yield the aforementioned 17β-N-(3-dimethylaminopropyl)-N-methylaminoandrost-5-ene.

An alternate process for the manufacture of the instant compounds wherein R is hydrogen involves condensation of a 17-keto starting material with the dialkylaminoalkylamine in the presence of an acidic catalyst followed by reduction, either chemically or by catalytic hydrogenation, of the resulting amine. As a specific illustration, androst-5-en-17-one and 3-dimethylaminopropylamine are heated together in the presence of a catalytic quantity of p-toluenesulfonic acid to yield 17-N-(3-dimethylaminopropyl)iminoandrost-5-ene. Reduction of the latter substance with lithium aluminum hydride in dioxane results in 17β-N-(3-dimethylaminopropyl)aminoandrost-5-ene.

Equivalent to the instant amines for the purposes of this invention are the corresponding nontoxic acid-addition and quaternary salts exemplified by the citrate, tartrate, maleate, ascorbate, gluconate, lactate, succinate, phosphate, sulfate, hydrobromide, hydrochloride, methiodide, ethiodide, methochloride, methobromide, methosulfate, ethosulfate, etc.

The compounds of this invention display valuable antibiotic properties as is evidenced by their anti-algal, anti-bacterial, anti-protozoal, and dicotyledenous seed germination-inhibitory activity. They are, in particular, capable of inhibiting the growth of such organisms as *Chlorella vulgaris, Diplococcus pneumoniae,* and *Tetrahymena gelleii*. In addition, these compounds are useful as pharmacological agents in consequence of their ability to reduce blood plasma cholesterol levels.

The invention is illustrated more fully by the examples which follow. These examples are set forth by way of illustration only and it will be understood that the invention is not to be construed as limited either in spirit or in scope by the details contained therein as many modifications in materials and methods will be apparent from this disclosure to those skilled in the art. In these examples, temperatures are given in degrees centigrade (° C.) and quantities of materials in parts by weight unless otherwise noted.

*Example 1*

To a solution of 10 parts of androsta-3,5-dien-17-one in 30 parts of formic acid is added, dropwise with stirring over a period of about 15 minutes, 20 parts of 3-dimethylaminopropylamine. The reaction mixture is heated at 160–175° for about 30 hours, and the tacky solid which forms upon cooling is stirred rapidly with a solution of 35 parts of sodium hydroxide in 800 parts of water for about 45 minutes. The precipitate which forms is collected by filtration, washed with water, then extracted with ethyl acetate. The ethyl acetate layer is separated, washed with water and dried over anhydrous sodium sulfate containing decolorizing carbon. Removal of the solvent by distillation under reduced pressure affords 17β-N-(3-dimethylaminopropyl)formamidoandrosta-3,5-diene as an oil. This substance exhibits ultraviolet absorption maxima at about 227, 234 (molecular extinction coefficient=17,600) and 242 millimicrons and can be represented by the following structural formula

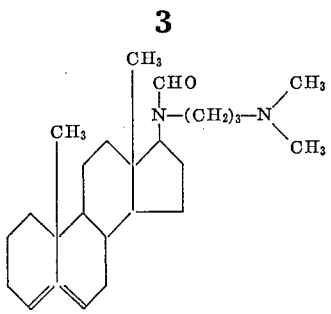

Example 2

By substituting an equivalent quantity of 2-diethylaminoethylamine and otherwise proceeding according to the processes described in Example 1, there is obtained 17β - N - (2 - diethylaminoethyl)formamidoandrosta-3,5-diene.

Example 3

To a mixture of 6 parts of lithium aluminum hydride with 250 parts of dioxane is added, dropwise with stirring, a solution of 12 parts of 17β-N-(3-dimethylaminopropyl)formamidoandrosta-3,5-diene in 250 parts of dioxane. The resulting reaction mixture is heated at the reflux temperature for about 18 hours, then is diluted successively with a solution of 6 parts of water in 30 parts of dioxane, 4.5 parts by volume of 20% aqueous sodium hydroxide, and 19 parts of water. The resulting mixture is filtered, and the separated inorganic salts are washed on the filter with dioxane. Evaporation of the filtrate to dryness affords 17β-N-(3-dimethylaminopropyl)-N-methylaminoandrosta-3,5-diene as an oil. This compound is further characterized by an optical rotation, in chloroform, of —77° and an ultraviolet absorption maximum at 234 millimicrons with a molecular extinction coefficient of about 18,000. It is characterized further by the following structural formula

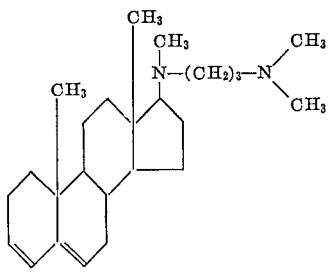

Example 4

The reaction of an ethereal solution of 17β-N-(3-dimethylaminopropyl) - N - methylaminoandrosta-3,5-diene with isopropanolic hydrogen chloride results in the corresponding dihydrochloride, represented by the following structural formula

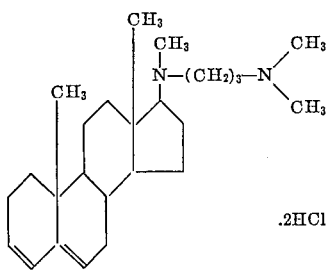

Example 5

By the substitution of an equivalent quantity of 17β-N-(2-diethylaminoethyl)formamidoandrosta-3,5-diene in the procedure of Example 3, there is obtained 17β-N-(2-diethylaminoethyl)-N-methylaminoandrosta-3,5-diene.

Example 6

A mixture of 10 parts of 17β-N-(3-dimethylaminopropyl)formamidoandrosta-3,5-diene, 32 parts of methanol and 12 parts of concentrated hydrochloric acid is heated at the reflux temperature for about 15 hours, then is cooled and concentrated to dryness under reduced pressure. Recrystallization of the resulting solid residue from aqueous isopropyl alcohol affords 17β-N-(3-dimethylaminopropyl)aminoandrosta-3,5-diene.

Example 7

To a solution of 5 parts of androst-5-en-17-one in 25 parts of formic acid is added, with stirring and cooling, 10 parts of 3-dimethylaminopropylamine. The resulting mixture is heated at the reflux temperature for about 24 hours, then is cooled and poured into 500 parts of a mixture of ice and water containing 18 parts of sodium hydroxide. The resulting precipitate is collected by filtration, washed with water, then extracted with ethyl acetate. The organic solution is separated, washed with water, dried over anhydrous sodium sulfate and stripped of solvent at reduced pressure. The oily residue solidifies upon standing and is recrystallized from aqueous acetone to yield 17β-N-(3-dimethylaminopropyl)formamidoandrost-5-ene. This compound is characterized by an optical rotation of +52.5° in chloroform and also by the following structural formula

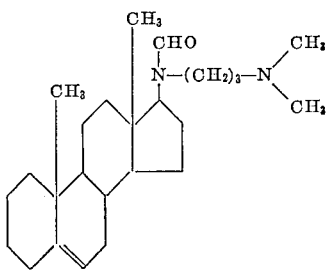

Example 8

By substituting an equivalent quantity of 2-diethylaminoethylamine and otherwise proceeding according to the processes of Example 7, there is obtained 17β-N-(2-diethylaminoethyl)formamidoandrost-5-ene.

Example 9

To a warm mixture of 2.3 parts of lithium aluminum hydride with 60 parts of dioxane is added, over a period of about 20 minutes with stirring, a solution of 3.7 parts of 17β-N-(3-dimethylaminopropyl)formamidoandrost-5-ene in 60 parts of dioxane. The resulting reaction mixture is heated at the reflux temperature for about 20 hours, after which time a solution of 2.3 parts of water in 20 parts of dioxane, 2 parts by volume of 20% aqueous sodium hydroxide, and 7.8 parts of water are successively added. The resulting precipitated inorganic salts are collected by filtration and washed on the filter with tetrahydrofuran. Evaporation of the filtrate under reduced pressure affords 17β - N - (3 - dimethylaminopropyl) - N-methylaminoandrost-5-ene as an oil. This substance is further characterized by an optical rotation, in chloroform, of —43.5° and also by the following structural formula

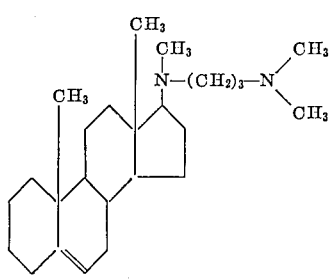

Example 10

An ethereal solution of 17β-N-(3-dimethylaminopropyl)-N-methylaminoandrost-5-ene is contacted with excess isopropanolic hydrogen chloride, and the resulting precipitate is recrystallized from aqueous isopropyl alcohol to afford the corresponding dihydrochloride, characterized by an optical rotation, in aqueous ethanol, of −24.5°.

Example 11

By substituting an equivalent quantity of 17β-N-(2-diethylaminoethyl)formamidoandrost-5-ene and otherwise proceeding according to the processes described in Example 9, there is obtained 17β-N-(2-diethylaminoethyl)-N-methylaminoandrost-5-ene.

Example 12

The substitution of an equivalent quantity of 17β-N-(3-dimethylaminopropyl)formamidoandrost-5-ene in the procedure of Example 6 results in 17β-N-(3-dimethylaminopropyl)aminoandrost-5-ene.

What is claimed is:
1. A compound of the formula

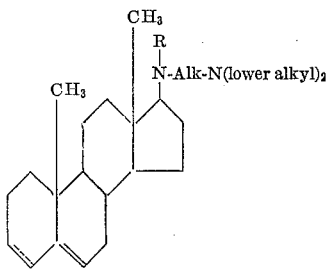

wherein R is selected from the group consisting of hydrogen, a formyl and a lower alkyl radical, Alk is a lower alkylene radical, and the dotted line indicates the optional presence of a doubly-bonded linkage between carbon atoms 3 and 4.

2. 17β - N - (dimethylaminopropyl)formamidoandrost-5-ene.

3. A compound of the formula

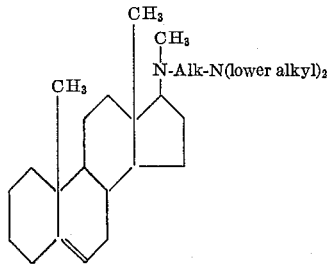

4. A compound of the formula

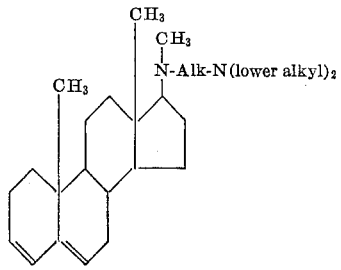

5. A compound of the formula

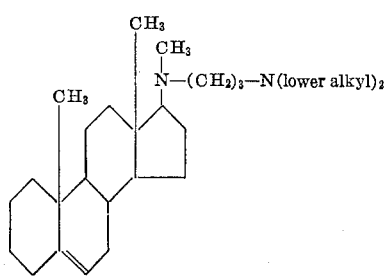

6. 17β - N - (3 - dimethylaminopropyl) - N - methylaminoandrost-5-ene.

7. A compound of the formula 8. 17β - N - (3 - dimethylaminopropyl) - N - methylaminoandrosta-3,5-diene.

9. 17β - N - (3 - dimethylaminopropyl) - N - methylaminoandrosta-3,5-diene dihydrochloride.

No references cited.

ELBERT L. ROBERTS, *Acting Primary Examiner.*
HENRY FRENCH, *Assistant Examiner.*